United States Patent

[11] 3,604,737

| | | |
|---|---|---|
| [72] | Inventor | Thomas A. Tarpey<br>Lynn, Mass. |
| [21] | Appl. No. | 762,060 |
| [22] | Filed | Sept. 24, 1968 |
| [45] | Patented | Sept. 14, 1971 |
| [73] | Assignee | Xerox Corporation<br>Rochester, N.Y. |

[54] METHOD OF JOINING MATERIALS
2 Claims, 3 Drawing Figs.

[52] U.S. Cl. ..................................................... 287/20.3,
29/517, 287/52.04
[51] Int. Cl. .......................................................... F16b 11/00,
B25g 3/28
[50] Field of Search........................................... 248/56;
287/52.04, 20.3; 29/517; 285/162, 196, , DIG. 21

[56] References Cited
UNITED STATES PATENTS

| | | | |
|---|---|---|---|
| 1,525,014 | 2/1925 | Volk................... | 248/56 X |
| 1,721,119 | 7/1929 | Houghton............ | 248/56 X |
| 1,781,721 | 11/1930 | Earl................... | 287/53 |
| 3,254,865 | 6/1966 | Stickell............... | 248/56 |

*Primary Examiner*—Chancellor E. Harris
*Attorneys*—Paul M. Enlow, Norman E. Schrader, James J. Ralabate, Ronald Zibelli and Thomas J. Wall ABSTRACT: The method of joining a first encompassing member to a support member by inserting an elongated bushinglike element therebetween. The bushinglike element has a fulcrumed interior surface and is of a length such that a portion of the element extends exterior the encompassing member. The extended portion of the element is collapsed into locking or gripping contact with the support member. The opposite end of the element is expanded simultaneously into locking contact with the encompassing member as it is forced upwardly about the fulcrum.

PATENTED SEP 14 1971  3,604,737

INVENTOR.
THOMAS A. TARPEY

BY

ATTORNEY 3,604,737

METHOD OF JOINING MATERIALS

This invention relates to means for joining two individual parts and, in particular, to a method by which an encompassing member is locked to a support member.

More specifically, this invention relates to a method by which a member such as a gear or cam is joined to a shaft. It has heretofore been common practice in industry when mounting a gear or cam member to a shaft to first stake and then pin the member to a hub. The hub is then screwed and pinned to the supporting shaft. As can be seen, many operations are involved which have heretofore been time consuming and costly. Furthermore, joining of members of unlike materials by means of pins or dowels has proven in many instances to be unsatisfactory. The forces transmitted through the pin must, because of the pin's inherent small size, be localized in the mated parts. When a fiber or plastic gear is pinned to a metal shaft, for example, the relatively weaker gear material tends to wear in the area of the pin causing the part to fail in a relatively short time.

It is therefore a primary object of this invention to join two individual parts in a relatively simple operation.

It is a further object of this invention to improve the method by which a gear or cam member can be locked to a shaft.

Yet another object of this invention is to improve the method by which two dissimilar materials can be securely joined.

A still further object of this invention is to more securely mount an encompassing member on a support member by increasing the surface area through which forces are transmitted from one member to the other.

These and other objects of the present ton are attained by means of an intermediate bushinglike element adapted to be inserted intermediate an encompassing member and a support member, collapsing one end of said bushinglike element to lock the bushing to the supporting member and simultaneously expanding the opposite end of said bushinglike member into locking contact with the encompassing member.

For a better understanding of the invention as well as other objects and further features thereof, reference is had to the following detailed description of the invention to be read in connection with the accompanying drawings, wherein.

The present invention will be described in reference to joining a cam member to a round shaft. However, it should be clear that the present invention is not limited to any specific part or shapes. Any two parts capable of being interposed by an intermediate bushing can be joined by the instant invention. Furthermore, the present invention is ideally suited for joining parts of dissimilar materials or of materials which do not readily lend themselves to more conventional joining processes.

Figure 1:
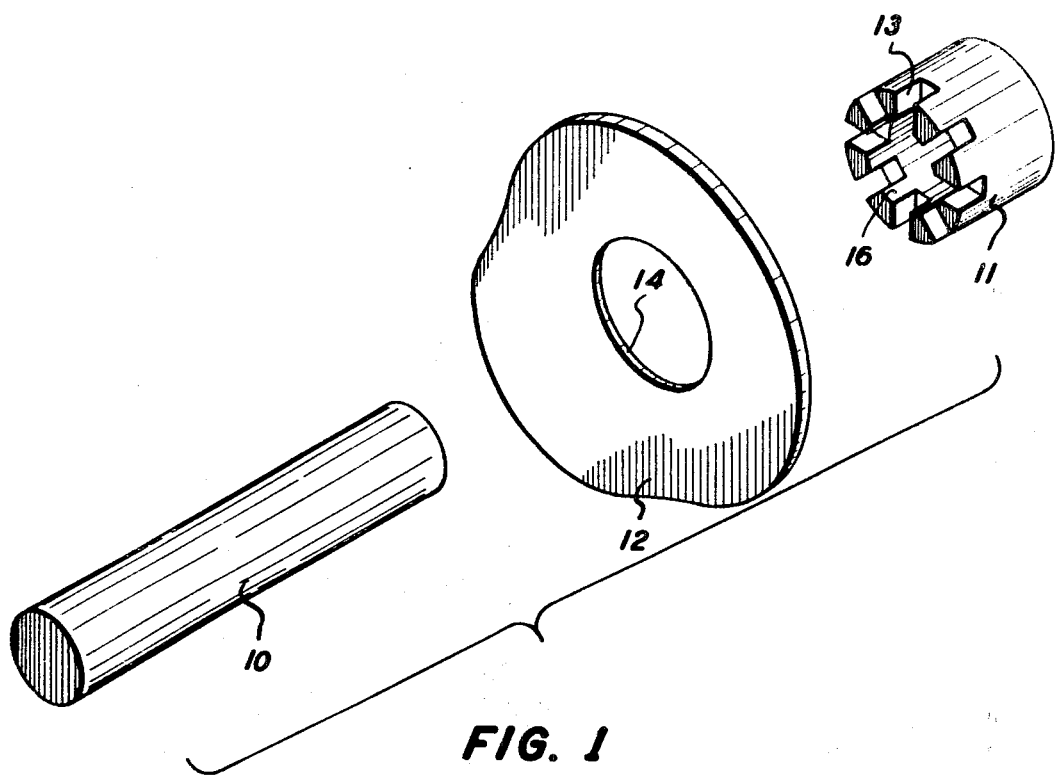
FIG. 1 is an exploded view showing the bushinglike element, the encompassing member, and supporting member prior to being joined.
Figure 2:
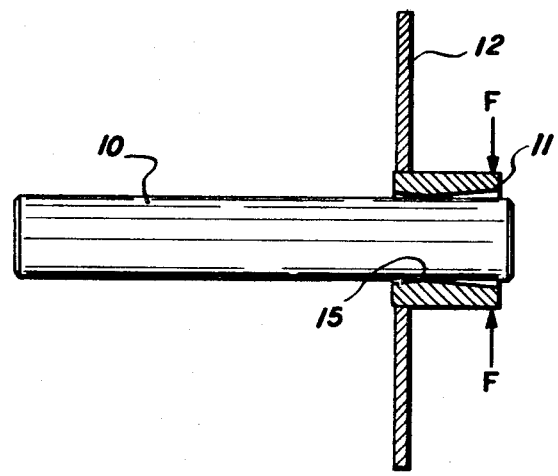
FIG. 2 is a cross-sectional side view of the preferred embodiment showing the bushinglike element in cooperative relationship with the encompassing and supporting members prior to collapsing one end of said bushinglike element.

FIG. 1 shows an exploded view of a shaft 10, a deformable bushinglike element 11, and a cam member 12. The various elements are adapted to be superimposed one upon the other as shown in FIG. 2. The cam member has an aperture 14 therein which is adapted to slip over the outside surface of bushing 11. A clearance between the parts ranging from a close running fit to a loose running fit has been found satisfactory for purposes of the instant invention. However, as will become clear from the description below, the clearance maintained between parts can be varied over a wide range depending on many variable factors, as for example, the materials involved, and the size and shape of the various parts to be joined.

At one end of the bushing 11 there are a series of slotted apertures 13 which extend radially through the walls of the bushing. The slots extend to a length at least equal to the width of the encompassing member. In the assembly, the encompassing cam member is positioned over the slotted end of the bushing prior to being locked in position. The bushing is substantially complementary to the cross-sectional shape of the member that it is mated to. For example, the outside surface of the bushing is cylindrical in shape and substantially complements aperture 14 in cam member 12. Likewise, the aperture in the bushing is substantially the same shape as the outside surface of the shaft. It should be obvious therefore that if the shaft was a hexagon-shaped member, the aperture provided in the bushing would likewise be hexagon shaped.

As shown in FIG. 2, the bushing is elongated in respect to the width of the cam member. In assembly, a portion of the bushing extends exterior to the encompassing member. It should be further noted that the bushing, although cylindrical in cross section, is wedge shaped along its elongated length. To obtain this wedge shape, two round tapered holes are machined into each end of the bushing, the diameter of the holes being larger at the ends and diminishing as they progress inwardly so that the small diameter of each tapered hole is coincidental with the other. The point of joinder of the two tapered holes forms a wedge of fulcrum 15. Preferably, the tapered holes should be formed so that the fulcrum underlies the extended portion of the bushing exterior the encompassing member.

In operation, the bushing is first positioned on the shaft and then the cam member slipped over the outside of the bushing. The cam member is positioned as shown in FIG. 2 so that the member encompasses the slotted end of the bushing and is substantially perpendicular to the centerline of the shaft. A portion of the elongated bushing extends beyond the encompassing cam member and provides a working surface upon which an external force can be applied. A uniform compressive or collapsing force is applied to the working surface on the extended end of the bushing, such that sufficient work is expended on this surface to collapse the bushing material downwardly into locking contact with the shaft surface. The working surface is in effect collapsed or deformed downwardly about the fulcrum 15.

The forces which act to collapse one end of the bushing about fulcrum 15, simultaneously act to expand the opposite end of the bushing. That is, the slotted end thereof of the bushing is caused to rotate upwardly about the pivot point and expands into contact with the encompassing cam member. The bushing in effect, acts as a lever which pivots about the fulcrum point 15 (FIG. 2). Just as in the first class lever, the amount of locking force exerted on the cam and shaft members is dependent, among other things, on the position of the fulcrum. As noted, in the preferred embodiment the fulcrum point is positioned somewhat outside the cam member bushing. ensure that the bushing is expanded into contact with the entire surface area of aperture 14 (FIG. 1).

In practice, the collapsing force applied to the extended end of the bushing is also used to force the slotted end of the bushing upwardly into locking contact with the cam member. When a body is subjected to a direct stress, it undergoes a certain amount of lateral as well as longitudinal deformation. The slots or the bushing allow the material to deform both laterally and longitudinally as it is forced into expanded contact with the cam member. It is generally required that a motion translating device such as a cam or gear be mounted substantially perpendicular to the centerline of the shaft. If the forces exerted by the lever action herein described are not uniformly distributed on the interior surface of the cam, the cam can become misaligned during assembly. It has been found that by machining the slots or grooves in the bushing provides a means by which the bushing becomes more or less self-aligning in that the individual embossed sections 16 (FIG. 1) can deform in more than one direction as they are forced into contact with the interior surface of the cam member.

It is preferred that the working surface of the bushing be collapse into locking contact with the shaft by means of electromagnetic forces. A magnetic forming device manufactured by General Dynamics under the trade name "Magneform" has been found to be ideally suited for so collapsing the bushing. When a conductive material carrying a current is placed within a magnetic flux field, the conductor is subject to a force substantially proportional to the strength of the flux acting perpendicular to the flow of current. In the "Magneform" device, the principle is utilized to build up an extremely high work force almost instantaneously. A stationary conductor is placed within a varying magnetic field and a current then induced in the conductor. By discharging electrical energy through the conductor during an extremely short period of time, a high-density flux field is created capable of setting up eddy currents in or on the surface of a conductive workpiece in the field. High uniform forces on workpieces of various shapes can be created by shaping the stationary conductor similar to the shape of the workpiece. For further information concerning the magnetic forming apparatus as herein described, reference is had to U.S. Pat. No. 2,976,907.

In practice, the bushing is formed of a deformable conductive material and the working surface which extends exterior to the encompassing member is placed within a magnetic coil. The coil is shaped so that it is capable of delivering a substantially uniform collapsing force over the entire working surface of the bushing. Sufficient energy is applied to the workpiece to deform the extended end of the bushing into locking contact with the shaft. Because of the leverlike configuration of the interior surface of the bushing, the opposite or slotted end of the bushing is simultaneously expanded into locking contact with the cam member as the bushing material deforms about fulcrum 15.

Although the use of magnetic collapsing forces is preferred because of its ability to deliver a uniform force over almost any shaped working surface, mechanical closing forces can be similarly utilized. For example, the cylindrical outside surface of the bushing could be collapsed by means of a collet-type tool. Mechanical pressers having shaped work heads could also be utilized to collapse the extended end of the bushing. This latter method is particularly well suited when joining parts which have flat rather than cylindrical surfaces thereon.

Figure 3:
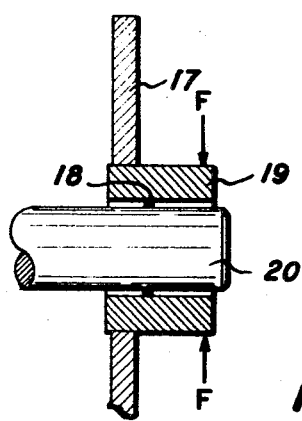
FIG. 3 is a further embodiment of the instant invention showing a fulcrum member positioned between the bushinglike element and the support member.

Referring now to FIG. 3, there is shown therein another method of joining two members embodying the teachings of the present invention. An encompassing member 17 is positioned over the slotted end of bushing 19. The interior surface of bushing 19, rather than being fulcrumed shaped as in FIG. 2, is of a constant diameter. An individual fulcrum member 18 is positioned between shaft 20 and bushing 19 and acts as the pivot point about which the bushing id deformed. The fulcrum member is actually a snapring capable of being prepositioned on shaft 20 prior to mounting bushing 19 thereon. As can be seen, the type of movable fulcrum member affords a wider flexibility to this method of joining parts. By changing the position of the fulcrum member in the reference to the length of the bushing a different combination of locking forces can be produced upon the encompassing and support members for a given loading force.

While this invention has been described with reference to the structure disclosed herein, it is not confined to the details set forth and this application is intended to cover such modifications or changes as may come within the purposes of the improvements of the scope of the following claims.

What is claimed is:

1. In combination, a support member having a cylindrical exterior surface, an encompassing member having a cylindrical interior surface, and a single-piece cylindrical bushinglike element formed of a deformable material for joining the support member to the encompassing member, said element being insertable between the members and being of a length greater than the length of the encompassing member, said element having an interior surface including a fulcrum positionable continuously around and in contact with the exterior surface of the support member, said element also having an exterior surface, a portion of which is engageable with the interior surface of the encompassing member, said element being formed with axial slots adjacent an end thereof whereby collapsing the element adjacent the end opposite the slotted end produces an outward extension of the slotted end of said element, said slots being substantially equal in length to the interior surface of the encompassing member.

2. In combination, a support member, an encompassing member, and a single-piece, cylindrical bushinglike element of a deformable material for joining the encompassing member to the support member, said element being adapted to be inserted between said members and being of a length greater than the length of said encompassing member whereby the element has a working surface extending exterior said encompassing member, the interior surface of said element including a fulcrum positioned continuously around said support member which has exterior walls that are engageable with said fulcrum whereby collapsing the work surface at the end of said element simultaneously produces an outward extension of the opposite end of said element, said element also having slotted apertures in the expanded end of said element, said apertures passing radially through said element and being of a length substantially equal to the length of said encompassing member.